United States Patent [19]

Healey

[11] Patent Number: 4,923,269

[45] Date of Patent: May 8, 1990

[54] BIDIRECTIONAL OPTICAL SPACE SWITCH

[75] Inventor: Peter Healey, Ipswich, England

[73] Assignee: British Telecommunications public limited company, Great Britain

[21] Appl. No.: 249,560

[22] PCT Filed: Jan. 28, 1988

[86] PCT No.: PCT/GB88/00052

§ 371 Date: Sep. 23, 1988

§ 102(e) Date: Sep. 23, 1988

[87] PCT Pub. No.: WO88/05986

PCT Pub. Date: Aug. 11, 1988

[30] Foreign Application Priority Data

Jan. 29, 1987 [GB] United Kingdom ............... 8701996

[51] Int. Cl.$^5$ .............................................. G02B 6/26
[52] U.S. Cl. ................................. 350/96.15; 350/334; 350/347 V; 350/3.66
[58] Field of Search ............... 350/96.11, 96.12, 96.13, 350/96.14, 169, 3.66, 347 V, 347 R, 334

[56] References Cited

U.S. PATENT DOCUMENTS

| | | |
|---|---|---|
| 3,985,975 | 10/1976 | Steensma . |
| 4,278,327 | 7/1981 | McMahon et al. ......... 350/347 V X |
| 4,385,799 | 5/1983 | Soref ................... 350/96.13 |
| 4,516,837 | 5/1985 | Soref et al. ............... 350/96.20 X |
| 4,653,849 | 3/1987 | Boirat et al. .............. 350/96.22 |

FOREIGN PATENT DOCUMENTS

| | | |
|---|---|---|
| 0161683 | 11/1985 | European Pat. Off. . |
| 2243573 | 4/1975 | France . |
| 2385266 | 10/1978 | France . |
| 0161827 | 10/1982 | Japan ................... 350/96.14 |
| 0182423 | 9/1985 | Japan ................... 350/96.14 |
| 85/04544 | 10/1985 | World Int. Prop. O. . |

OTHER PUBLICATIONS

"Electrooptic 4×4 Matrix Switch for Multimode Fiber-Optic Systems" by Soref, Applied Optics, vol. 21, No. 8/Apr. 15, 1982, pp. 1386-1392.

"4×4 Optical-Gate Matrix Switch" by Himeno et al., J. of Lightwave Technology, vol. LT-3, No. 2, Apr. 1985, pp. 230-234.

Proceedings of the European Conference on Optical Communication, Session A XIII: Systems (II), Sep. 22-24, 1982, (Cannes, FR), J. P. Herriau et al: "Light Beam Steering Using a Reversible Photo-Induced Grating in B.S.O. Crystals", pp. 439-441.

Proceedings of the International Switching Symposium, May 7-11, 1984, Florence, Session 41 A, paper 5, North-Holland Publ. Co., (Amsterdam, NL); P. Gravey et al: "Optical Switching Technologies for High Capacity Exchanges", pp. 1-7.

Krile et al, "Holographic Representations of Space-Variant System Using Phase-Coded Reference Beams": Applied Optics, Dec. 1977, vol. 16, No. 12, pp. 3131-3135.

(List continued on next page.)

Primary Examiner—William L. Sikes
Assistant Examiner—Akm E. Ullah
Attorney, Agent, or Firm—Nixon & Vanderhye

[57] ABSTRACT

A bidirectional optical space switch for selectively coupling an input signal to a selected output comprises two arrays of inputs (1, 8), two arrays of outputs (5, 9), polarizing beam splitters (2, 4), and a matrix of cells (3) each of which is selectively capable of varying the polarization state of light passing through it in response to an applied control signal. A first optical system (6) couples each of inputs (1) and a corresponding one of outputs (9) with a corresponding column of cells while a second optical system (7) couples each of inputs (8) and a corresponding one of outputs (5) with a corresponding row of cells. One of inputs (1) is switched to one of outputs (5) by activating the appropriate cell so that it rotates the polarization of light passing through it by 90°. This also couples one of inputs (8) to one of outputs (9) thereby providing bidirectional switching. Use of combined beam splitters and polarizers (2, 4) provides bidirectionally at substantially no loss of light additional to that lost on discrimination of the polarization states.

19 Claims, 1 Drawing Sheet

OTHER PUBLICATIONS

LaMacchia et al, "Coded Multiple Exposure Holograms", Applied Optics, Jan. 1968, vol. 7, No. 1, pp. 91–94.

Soref, "Low-Cross Talk 2×2 Optical Switch", Optics Letter, vol. 6, No. 6, Jun. 1981, pp. 275–277.

Spanke, "Architectures for Large Non-Blocking Optical Space Switches", IEEE Journal of Quantum Electronics, vol. QE-22, No. 6, Jun. 1988, pp. 964–967.

Wagner et al, "Electrically Controlled Optical Switch for Multimode Fiber Applications", Applied Optics, vol. 19, No. 17, Sep. 1980, pp. 2921–2925.

BIDIRECTIONAL OPTICAL SPACE SWITCH

The present invention relates to a bidirectional optical space switch which is capable of use in a centralised switching system for an optical network. A centralised switching system is the simplest active network which is compatible with optical and electronic multiplexing, offsets the maximum network size, range, and flexibility and is also compatible with the existing wire-networks.

SUMMARY OF THE INVENTION

A paper to entitled "4×4 optical—Gate matrix switch" by A. Himeno and M. Kobayashi (Journal of lightwave Technology Vol LT-3 No. 2 April '85) discloses an optical gate matrix switch in which optical signals entering each input port $I_i$ of four input ports are distributed by an optical splitter $S_i$ to each of gate elements $G_{i1}$ to $G_{i4}$. When a desired single gate $G_{ij}$ is opened a light signal which can pass through the gate to an output port $O_j$ via a combiner $C_j$, which combines the output of all gates $G_{1j}$ to $G_{4j}$, to an optical receiver. This arrangement permits multiconnections between any input port $I_j$ and any plural output ports $O_j$ to be obtained. Each optical gate $G_{ij}$ is formed by a polarisation rotator placed between its own polariser and crossed analyser to form an on-off optical gate controllable by a driving voltage applied to the polarisation rotator. A disadvantage of this arrangement is that it is uni-directional.

According to the present invention a bi-directional optical space switch comprises:

a first and a second array of inputs for emitting optical signals to be switched;

a first and a second array of outputs for receiving switched optical signals from the first and second array of inputs, respectively;

an active array of cells having first and second sides each cell being selectively capable of varying the polarisation state of light passing through from one side of the cell to the other in response to an applied control signal;

a first optical coupling means for optically coupling the first sides of each of a plurality of groups of cells with a corresponding inputs of the first array of inputs and with a corresponding output of the second array of outputs;

a second optical coupling means for optically coupling the second sides of each of a plurality of groups of cells witha corresponding input of the second array of inputs and with a corresponding output of the second array of outputs;

the first and second optical coupling means including a respective first and second polarising beam splitter each arranged both to polarise light travelling from each input to the array of cells and to direct appropriately polarised light, only, passing through a cell away from the inputs and to the outputs.

The polarising beam splitters may, for example, comprise two right angle prisms having their hypotenuse faces cemented together arid sandwiching a dielectric multilayer so that light polarised in the hypotenuse plane is reflected by the film and turned through 90°/o whereas light polarised transverse to the hypotenuse plane passes straight through the splitter. The use of a polarising beam splitter in the bidirectional switch according to the present invention ensures that there is substantially no loss of light save for that lost on discrimination by its polarisation state since the polarising beam splitters provide both the polarising means and the beam splitters. If a non-polarisation state selective beam splitter were used in series with a separate polariser there would be typically a 50°/o loss, at both beam splitters leading to a minimum of a 75°/o power loss through the switch. The present invention therefore provides a particularly effective bi-directional optical switch.

Preferably the active array of cells has the form of a matrix array with the optical coupling means being arranged to connect each input to its respective column, or row, of the matrix array of cells and to couple each row, or column, to its respective output. Preferably the input and output arrays are formed by linear arrays arranged perpendicularly to one another and the optical coupling means are formed by lenses or holograms arranged to couple the light from a particular input to a particular column or row of the array and, correspondingly arranged to couple light from a particular row or column of the array to its respective output.

The active array of cells is preferably formed by an array of liquid crystal devices including devices of the twisted-nematic type. However, other types of liquid crystal devices such as scattering cells may be cascaded with the devices of the twisted nematic type to improve the overall contrast ratio.

The polarising beam splitters are preferably arranged to direct to an output light in a polarisation state opposite to that of light impinging on the active cell from an output so that, it is only when the light passing through the selected cell has its plane of polarisation rotated through 90°/o that it can pass through the polarising beam splitter downstream from the active cell array and be directed to an output. However, it is also possible to have the polarisating beam splitter arranged to direct to an output light in a polarisation state the same as the light impinging on the active cell array from an input and arrange for all of the active cells except for the selected cell to rotate the plane or polarisation of light passing through them by 90°/o.

Whilst typically an optical switch according to the present invention is arranged so that each and every input can be selectively coupled to each and every output it is also possible to arrange for the distribution and collection means to provide particular multiple connection and barring schemes. Thus, where it is required that a particular input signal is sent to more than one output destination, it is possible to arrange for the optical means to couple corresponding cells in each group to more than one output or, where it is required for a particular input not to be able to be connected to a particular output, it is possible to arrange for the optical means not to couple the corresponding cells in some of the groups to a particular output.

The arrays of inputs may be provided by the ends of a number of optical fibre waveguides or, alternatively, by a number of optical devices the outputs of which are modulated by the input signals. Thus, each array of inputs may all be taken from a single optical source which is split, and each split component is modulated in accordance with an input signal or, alternatively, the devices may be formed by a number of independent optical sources each of which is modulated in accordance with an input signal. The arrays of outputs may be formed by the ends of arrays of optical waveguides leading away from the optical space switch or they may be formed by an arrays of photodetectors which detect the light received. Such photodetectors may form part of an optical regenerator which, in turn, generates an output in the form of an optical signal.

In this way the optical space switch may be used as the switching element of an electrical communication system in which the electrical input signals are converted to optical signals at the input to the switch and the reconverted to electrical signals at the output. This can thus avoid the necessity of electrical conduction paths physically connecting each input to each output with switching means connected in series in each path which is required in a conventional electrical cross-bar switch and improves the switch bandwidth. Alternatively, the optical space switch may be used as a switching element for optical signals.

The invention will now be described, by way of example only, with reference to the accompanying drawings, in which

DETAILED DESCRIPTION OF THE DRAWINGS

Figure 1:
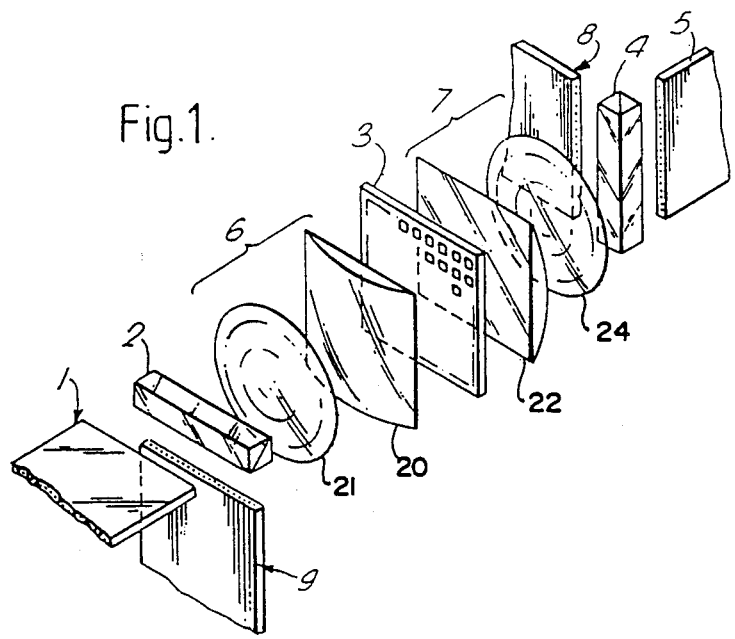
FIG. 1 is a diagrammatic perspective view of a first embodiment of the present invention.

Referring to FIG. 1, there is shown a first input array of inputs 1 formed by a ribbon of single mode or multimode optical fibres located in a horizontal plane emits light which is polarised by a polarising beam splitter 2 and impinges upon a liquid crystal matrix array 3. Light passing through the liquid crystal matrix array 3 passes through an analysing polarising beam splitter 4 and thence to a ribbon of single, or multimode output fibres 5, constituting the first array of outputs, located in a generally vertical plane if of the correct polarisation. An optical system 6 comprising a combination of cylindrical and plano-convex lenses 20, 21 is located between the beam splitter 2 and the liquid crystal device 3 to direct the light from each individual fibre in the ribbon 1 to its respective column of the liquid crystal device 3. The optical system 6 and the polarising beam splitter 2 together constitute the first optical means. A further optical system 7, also comprising a combination of cylindrical and plano-convex lenses 22, 24, is located between the device 5 and the beam splitter 4. These concentrate light from a row of the matrix 3 to its respective output fibre in the ribbon 5 which together with the second polarising beam splitter 4 constitute the second optical means. The apparatus also includes a second array of input fibres 8 located in the vertical plane and at right angles to the output ribbon 5, and a second array of output fibres 9 located in a vertical plane and generally perpendicular to the input ribbon 1. The liquid crystal device 3 is typically a twisted-nematic liquid crystal device divided into a N×N matrix, the ribbons 1, 9, 5 and 8 of input and output fibres each containing N fibres.

Thus considering light passing in a first direction through the switch from the input ribbon 1 to the output ribbon 5, the light is first polarised in the polariser beam splitter 2 and any rejected light reflected from the interface in the beam splitter 2 upwards (in the orientation as shown in FIG. 1). The optical system 6 spreads the non-rejected light from the particular input fibre over a column of cells of the liquid crystal device 3 which are in a position corresponding to that of the particular fibre in the ribbon. A control signal is applied to one or more of the cells in the column to cause a change in polarisation state of 90 degrees so that light passing through these cells has its direction of polarisation rotated through 90 degrees whereas the light passing through all of the other cells in that column is unaffected. The optical system 7 directs light from the different rows of the liquid crystals device 3 towards the ends of the respective output fibres in the ribbon 5. However, light transmitted through cells which have not changed their polarisation state are deflected by the interface of the beam splitter 4 and only light from those cells which have been rotated through 90 degrees are transmitted through the beam splitter to impinge upon the end faces of the fibres in the ribbon 5.

Light passing in the opposite direction through the switch is introduced via the optical fibres in the ribbon 8. Light of a particular polarisation state is reflected from the interface of the beam splitter 4 and focussed by the optical system 7 onto particular rows of the liquid crystal device 3 corresponding to the location of the optical fibres in the ribbon 8. Those cells in that particular row which have a control signal applied to them to cause a 90 degree rotation of the plane of polarisation for light coming from an input of the first array 1 also will change the polarisation of light passing through it from input of the second array of inputs 8. The optical system 6 collects light from all of the cells and directs it to the polarising beam splitter 2. Light which has not had its direction of polarisation changed passes straight through the beam splitter 2 whilst light which has has its polarisation state changed by 90 degrees is reflected by the inner face of the beam splitter 2 towards the ribbon of output optical fibres 9. The optical system 6 focusses the light from a particular column of the liquid crystal device 3 onto its respective optical fibres in the ribbon 9. Thus, once a particular channel has been established in the optical switch by applying a control signal to one particular cell of the liquid crystal device 3 two corresponding switch connection are made simultaneously, one in each direction through the optical switch.

Where $N=100$ a contrast ratio between light which passes through a selected cell of the liquid crystal device 3 and that which does not must be at least $10^4$ or 40 dB. With good quality polarising beam splitters 2 and 4 and a twisted-nematic liquid crystal array this is feasible.

Figure 2:
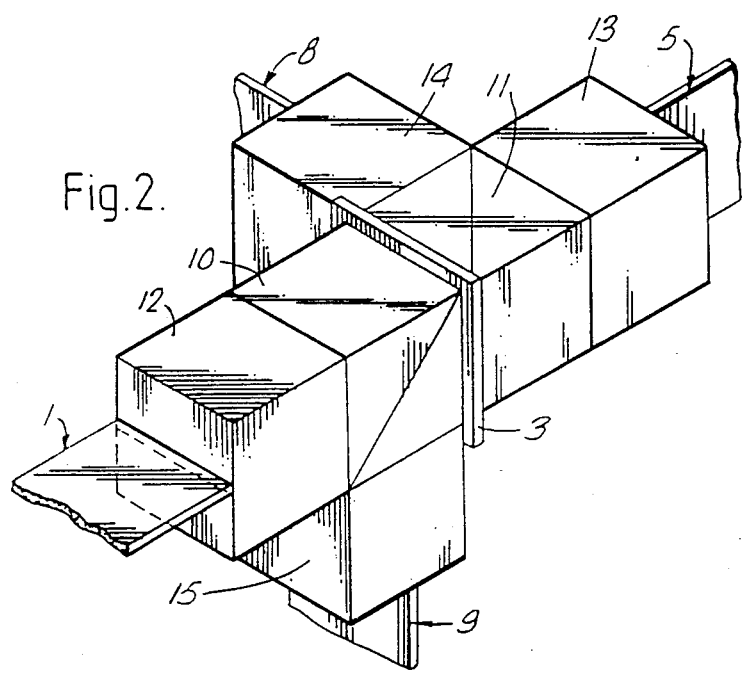
FIG. 2 is a diagrammatic perspective view of a second embodiment of the present invention.

Referring now to FIG. 2, an optical switch has arrays of inputs 1 and 8, arrays of outputs 5 and 9 and a liquid crystal matrix array of cells 3 as provided in the optical switch of FIG. 1. This embodiment differs from that shown in FIG. 1 in that polarising beam splitters 10 and 11 are positioned adjacent the matrix array 3. Optical systems 12, 13, 14 and 15 each comprising a combination of cylindrical and plano-convex lenses (illustrated schematically as optical boxes for clarity) direct light to or from the array 3, and to or from the inputs 1 and 8 and outputs 5 and 9 via the polariser beam splitters. Optical systems 12, 15 and polarising beam splitter 10, and optical systems 13, 14 and polarising beam splitter 11, constitute first and second optical means, respectively.

The switch of FIG. 2 is functionally equivalent to that of FIG. 1 but with polarisation of light from an input by a polarising beam splitter occurring after an optical system has directed the light to be spread over the appropriate row or column of cells, and with the light from the cells being analysed by a polarising beam splitter before passing to an optical system to be applied to an output.

The arrangement of FIG. 2 having the imaging optical components of each direction separated allows the output imaging optics of each direction to be optimised without affecting the input optics of the other direction. Input and output optics can therefore be independently optimised. On the other hand, this configuration requires a larger number of imaging devices than the configuration of FIG. 1.

Imaging optics utilising lens systems other than the specifically described with reference to FIG. 1 or 2, or other methods such as holographic imaging, may be employed which distribute the input signals amongst the cells and convey the resulting signals from the cells to the outputs, however combinations of cylindrical and plano-convex lenses are simple and efficient and have the advantage of being freely available.

It will be appreciated that an optical system according to the present invention can also be used for uni-directional transmission without modification.

The optical means may include optical waveguides which couple the light emitted from the inputs to the cells and thence from the cells to the outputs. In this case the distribution means may be formed by a number of bundles of optical fibres each bundle being coupled to an input and the fibres of each bundle being coupled, respectively, to individual cells in the group associated with that input. In this case the geometric configuration of the active array of cells may have any convenient form. For example, it may be formed by a linear or even a circular array and may be formed by a single, multi-element component or by a number of discrete components.

Where optical waveguides replace the lens systems 6 and 7 of the embodiment of FIG. 1 they have to be polarisation maintaining fibres. Where optical waveguides replace the lens systems 12, 13, 14 and 15 of FIG. 2 the ends of the waveguides will ideally be lensed to collimate light existing the waveguides to direct it to a chosen cell of the array 3 through the depth of the beam splitter.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:
1. A bi-directional optical space switch comprising:
a first array of inputs and a second array of inputs for emitting optical signals to be switched;
a first array of outputs and a second array of outputs for receiving switched optical signals from the first and second array of input, respectively;
an active array of cells having first and second sides each cell being selectively capable of varying the polarisation state of light passing through from one side of the cell to the other in response to an applied control signal;
a first optical coupling means for optically coupling the first sides of each of a plurality of groups of the active array of cells with a corresponding input of the first array of inputs and with a corresponding output of the second array of outputs;
a second optical coupling means for optically coupling the second sides of each of a plurality of groups of the active array of cells with a corresponding input of the second array of inputs and with a corresponding output of the first array of outputs;
the first and second optical coupling means including a respective first and second polarising beam splitter each arranged both to polarise light travelling from an input to the array of cells and to direct only appropriately polarised light passing through a cell away from the inputs and to the outputs.

2. An optical space switch as claimed in claim 1 in which each polarising beam splitter is located adjacent the array of cells.

3. An optical space switch as claimed in claim 1 in which each polarising beam splitter is located adjacent an array of inputs and an array of outputs.

4. An optical space switch as claimed in claim 1 in which the arrays of inputs and arrays of outputs comprise optical waveguides.

5. A bi-directional optical space switch comprising:
a first array of inputs and a second array of inputs for emitting optical signals to be switched;
a first array of outputs and a second array of outputs for receiving switched optical signals from the first and second array of inputs, respectively;
an active array of cells having first and second sides each cell being selectively capable of varying the polarisation state of light passing through from one side of the cell to the other in response to an applied control signal;
a first optical copling means for optically coupling the first sides of each of a plurality of groups of the active array of cells with a corresponding input of the first array of inputs and with a corresponding output of the second array of outputs;
a second optical coupling means for optically coupling the second sides of each of a plurality of groups of the active array of cells with a corresponding input of the second array of inputs and with a corresponding output of the first array of outputs;
the first and second optical coupling means including a respective first and second polarising beam splitter each arranged both to polarise light travelling from an input to the array of cells and to direct only appropriately polarised light passing through a cell away from the inputs and to the outputs,
wherein the active array of cells has the form of a matrix array, and
the first and second coupling means are arranged to couple each input to a respective row or column of cells, and to couple each row and column of cells to a respective output.

6. A bi-directional optical space switch comprising:
a first array of inputs and a second array of inputs for emitting optical signals to be switched;
a first array of outputs and a second array of outputs for receiving switched optical signals from the first and second array of inputs, respectively;
an active array of cells having first and second sides each cell being selectively capable of varying the polarisation state of light passing through from one side of the cell to the other in response to an applied control signal;
a first optical coupling means for optically coupling the first sides of each of a plurality of groups of the active array of cells with a corresponding input of the first array of inputs and with a corresponding output of the second array of outputs;

a second optical coupling means for optically coupling the second sides of each of a plurality of groups of the active array of cells with a corresponding input of the second array of inputs and with a corresponding output of the first array of outputs;

the first and second optical coupling means including a respective first and second polarising beam splitter each arranged both to polarise light travelling from an input to the array of cells and to direct only appropriately polarised light passing through a cell away from the inputs and to the outputs, wherein the active array of cells has the form of a matrix array, the first and second coupling means are arranged to couple each input to a respective row of column of cells, and to couple each row and column of cells to a respective output, and the optical coupling means are formed by lenses.

7. A bi-directional optical space switch comprising:
a first array of inputs and a second array of inputs for emitting optical signals to be switched;
a first array of outputs and a second array of outputs for receiving switched optical signals from the first and second array of inputs, respectively;
an active array of cells having first and second sides each cell being selectively capable of varying the polarisation state of light passing through from one side of the cell to the other in response to an applied control signal;
a first optical coupling means for optically coupling the first sides of each of a plurality of groups of the active array of cells with a corresponding input of the first array of inputs and with a corresponding output of the second array of outputs;
a second optical coupling means for optically coupling the second sides of each of a plurality of groups of the active array of cells with a corresponding input of the second array of inputs and with a corresponding output of the first array of outputs;
the first and second optical coupling means including a respective first and second polarising beam splitter each arranged both to polarise light travelling from an input to the array of cells and to direct only appropriately polarised light passing through a cell away from the inputs and to the outputs,
wherein the active array of cells has the form of a matrix array,
the first and second coupling means are arranged to couple each input to a respective row or column of cells, and to couple each row and column of cells to a respective output,
the optical coupling means are formed by lenses, and
wherein the optical coupling means includes a spherical lens and a plano-convex lens.

8. An optical space switch as claimed in claim 1 in which the active array of cells comprises an array of liquid crystal devices of the twisted-nematic type.

9. An optical space switch as claimed in claim 8 in which the twisted-nematic liquid crystal cells are each cascaded with a liquid crystal scattering cell.

10. An optical space switch as claimed in claim 1 in which the inputs comprise the ends of optical fibre waveguides.

11. An optical space switch as claimed in claim 1 in which the arrays of inputs are formed by a plurality of optical devices the outputs of which are modulated to provide the optical signals to be switched.

12. An optical space switch as claimed in claim 1 in which the outputs comprise the ends of optical waveguides.

13. An optical space switch as claimed in claim 1 in which the outputs comprise photodetectors which detect switched optical signals.

14. Apparatus for the bi-directional switching of optical signals comprising:
an array of cells, each of which is selectively capable of rotating the polarisation state of light passing through the cell in response to an applied control signal;
first and second arrays of inputs, located on first and second sides of the array of cells, for producing optical signals to be switched;
first and second arrays of outputs for receiving switched signals from the second and first arrays of inputs, respectively;
a first optical coupling system for optically coupling each of a plurality of groups of the array of cells with a corresponding input of the first array of inputs and with a corresponding output of the second array of outputs;
a second optical coupling system for optically coupling each of a plurality of groups of the array of cells with a corresponding input of the second array of inputs and with a corresponding output of the first array of outputs;
whereby ones of the first array of inputs are switched to ones of the second array of outputs and ones of the second array of inputs are switched to ones of the first array of outputs only if the polarisation of the light passing through the cells has been appropriately rotated in response to the application of control signals.

15. The apparatus of claim 14 in which:
the array of cells is a matrix array; and
the first and second optical coupling systems are arranged to couple each input to a respective row of column of cells, and to couple each row or column to a respective output.

16. The apparatus of claim 15 in which:
the first and second optical coupling systems each include lenses and a polarising beam splitter.

17. The apparatus of claim 16 in which:
the lenses include a spherical lens and a plano-convex lens.

18. A method for bi-directionally switching optical signals between first and second arrays of inputs, and corresponding second and first arrays of outputs comprising:
optically coupling each of the inputs of the first array of inputs and a corresponding one of the second array of outputs with a corresponding column or row of a matrix of cells,
said cells being selectively capable of rotating the polarisation state of light passing through the cells in response to an applied control signal;
optically coupling each of the inputs of the second array of inputs and a corresponding one of the first array of outputs with a corresponding column or row of said matrix of cells;
activating at least one cell to switch only appropriately rotated light from at least one of the inputs of the first input array to at least a corresponding one of the outputs of the second output array and switch only appropriately rotated light from at least one input of the second input array to at least a corresponding one of the outputs of the first output array.

19. A bi-directional optical space switch comprising: an array of cells individually capable of selectively rotating the polarization of optical signals passing therethrough;
an array of optical inputs and an array of optical outputs disposed on one side of said array of cells having individual inputs and outputs optically coupled to respective sub-groups of said cells; and
an array of optical outputs and an array of optical inputs disposed on an opposite side of said array of cells having individual inputs and outputs optically coupled to respective sub-groups of said cells.

* * * * *